US008214762B2

(12) United States Patent
Pai (10) Patent No.: US 8,214,762 B2
(45) Date of Patent: Jul. 3, 2012

(54) PRESENTING INFORMATION REGARDING SELECTED ITEMS

(75) Inventor: Samarth Sharath Pai, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 886 days.

(21) Appl. No.: 12/129,688

(22) Filed: May 30, 2008

(65) Prior Publication Data

US 2009/0300545 A1 Dec. 3, 2009

(51) Int. Cl.
*G06F 3/00* (2006.01)
(52) U.S. Cl. ..................... 715/811; 705/14.54
(58) Field of Classification Search .......... 715/811; 705/14.54
See application file for complete search history.

(56) References Cited

U.S. PATENT DOCUMENTS

| | | | |
|---|---|---|---|
| 6,112,212 A | 8/2000 | Heitler | |
| 6,182,287 B1 | 1/2001 | Schneidewend et al. | |
| 6,295,355 B1 | 9/2001 | O'Neal et al. | |
| 6,859,807 B1 | 2/2005 | Knight et al. | |
| 6,901,559 B1 | 5/2005 | Blum et al. | |
| 7,184,939 B1 | 2/2007 | Trowbridge et al. | |
| 7,467,348 B1* | 12/2008 | Taylor et al. | 715/205 |
| 7,676,745 B2* | 3/2010 | Egnor | 715/243 |
| 7,680,513 B2* | 3/2010 | Haitani et al. | 455/556.2 |
| 2004/0045028 A1 | 3/2004 | Harris | |
| 2006/0075104 A1* | 4/2006 | Kumer | 709/227 |
| 2007/0100653 A1 | 5/2007 | Ramer et al. | |
| 2007/0118520 A1 | 5/2007 | Bliss et al. | |
| 2007/0130020 A1* | 6/2007 | Paolini | 705/26 |
| 2007/0156446 A1* | 7/2007 | Jolly et al. | 705/1 |
| 2007/0185777 A1* | 8/2007 | Pyle et al. | 705/26 |
| 2007/0288437 A1* | 12/2007 | Xia | 707/3 |
| 2008/0010138 A1* | 1/2008 | Gunshor et al. | 705/14 |
| 2008/0307362 A1* | 12/2008 | Chaudhri et al. | 715/835 |
| 2009/0070320 A1* | 3/2009 | Budynek et al. | 707/5 |
| 2009/0307318 A1* | 12/2009 | Chappell et al. | 709/206 |
| 2010/0115389 A1* | 5/2010 | Gautestad | 715/205 |
| 2010/0131867 A1* | 5/2010 | Kumar | 715/758 |
| 2010/0191619 A1* | 7/2010 | Dicker et al. | 705/27 |
| 2010/0211453 A1* | 8/2010 | Huang | 705/14.39 |
| 2010/0241507 A1* | 9/2010 | Quinn et al. | 705/14.42 |
| 2010/0287183 A1* | 11/2010 | Kamireddy et al. | 707/769 |
| 2010/0306249 A1* | 12/2010 | Hill et al. | 707/769 |
| 2010/0332300 A1* | 12/2010 | Swatzell | 705/14.7 |
| 2011/0035774 A1* | 2/2011 | Parker | 725/40 |

OTHER PUBLICATIONS

Prasetyo, et al., "Naviz: User Behavior Visualization of Dynamic Page," Proceedings of 13th Data Engineering Workshop, 2002, 10 pages.
Dalgic, et al., "True Number Portability and Advanced Call Screening in a SIP-Based IP Telephony System," IEEE Communications Magazine, vol. 37, Issue 7, Jul. 1999, pp. 96-101.
Greenspun, "Chapter 9: User Tracking," part of Philip and Alex's Guide to Web Publishing, Jul. 2003, 7 pages.
411.com introductory web page, accessed at <<http://www.411.com/>>, accessed on Aug. 4, 2009, 2 pages.

* cited by examiner

*Primary Examiner* — Ryan Pitaro (57) ABSTRACT

An approach is described for recording the selections made by a user and then presenting information regarding these selections to the user in various contexts. Each selection corresponds to the user's express request to receive information (such as a telephone number) that is useful in performing a transaction (such as calling a particular business entity).

18 Claims, 9 Drawing Sheets

PRESENTING INFORMATION REGARDING SELECTED ITEMS

BACKGROUND

Network-accessible services provide a wealth of information regarding various topics. To cite merely one example, a network-accessible business directory may provide information regarding businesses in a particular city. In one approach, a user may interact with such a service by inputting one or more search terms associated with a target business of interest. The user then views a list of potential businesses that satisfy the search terms. The user may activate any item in the list to discover additional information regarding the business of interest.

In practice, a user may rely on a network-accessible service (such as a business directory) to repeatedly access the same information. For instance, a user who has investigated a photography store in downtown Seattle may repeatedly use a network-accessible service to retrieve information regarding this store. To facilitate a user's subsequent search, a network-accessible service may give the user a list of "recently viewed" items. For instance, the list of recently viewed items may correspond to pages in a shopping service that the user has browsed through in the past. The user may activate an item in the recently viewed list to access desired information, instead of repeating a time-intensive search from scratch.

However, the use of "recently viewed" lists is not always helpful. Some users have voracious appetites for network-accessible content. Accordingly, within the course of merely a week, a user may view hundreds of pages within a particular site. Presenting a summary of such activity does not help the user pinpoint the items which are truly relevant to his or her interests.

It is of course possible for the user to define a "favorites" list of items. However, creating and managing a favorites list is a manual task than can grow unwieldy as the number of items in the list increases.

SUMMARY

An approach is described for presenting recently selected items to a user. In one illustrative implementation, the approach entails using a network-accessible service (such as, but not limited to, a business directory) to provide a user interface presentation to the user. The user interface presentation may pertain to a particular entity (such as, but not limited to, a particular business). The user interface presentation includes one or more selectable items. On selecting an item, the network-accessible service provides additional information (such as a telephone number) associated with the entity. The approach then entails storing a record of the user's selection of the item. Subsequently, the approach entails presenting information to the user regarding the user's prior selection of the item.

The approach relies on the concealment of certain types of additional information from the main user interface presentation. The additional information that is concealed is selected such the user's activation of this information is correlated with the user's decision to take some express action with respect to the entity. For instance, consider the case in which the additional information is a telephone number. The user's selection of this additional information is reasonably correlated with the user's likely decision to contact a corresponding entity via telephone. For this reason, the user is likely to regard a list of prior item selections as being highly relevant to the user's current interests.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure describes an approach for presenting a list of previously selected items to a user. The list represents a subset of actions taken by the user that correlate with the user's probable actual interests. Hence, this approach provides a more focused way of conveying the user's probable interests than presenting an indiscriminate list of all recently viewed items. More generally, the concepts disclosed herein may address one or more of the challenges or problems previously noted, but are not limited to addressing all or any of these challenges or problems.

Many of the illustrative examples presented herein describe the case in which the selected items correspond to business telephone numbers. However, the principles described herein are not limited to this environment, and the ensuing description will cite other representative applications and environments.

This disclosure is organized as follows. Section A describes illustrative user interface presentations for providing a list of recently selected items. Section B describes various methods for implementing the user interface functionality described in Section A. Section C describes various systems for implementing the user interface functionality described in Section A. Section D describes illustrative data processing equipment that can be used to implement any aspect of the features described in preceding sections.

A. Illustrative User Interface Presentations

Figure 9:
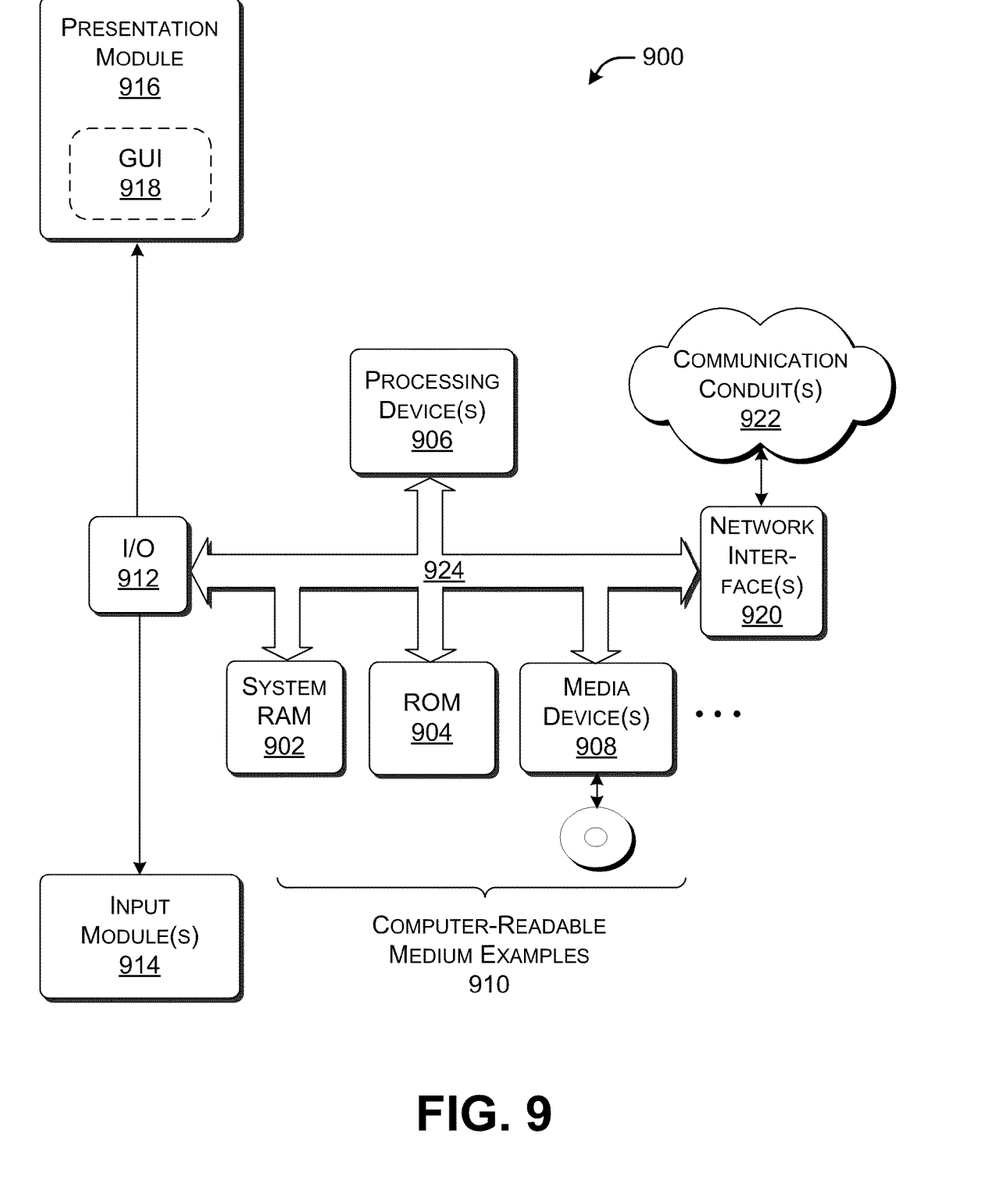
FIG. 9 shows illustrative processing functionality that can be used to implement any aspect of the features shown in the foregoing drawings.

As a preliminary matter, the various components shown in the figures can be implemented in any manner, for example, by software, hardware, firmware, manual processing operations, and so on, or any combination of these implementations. The phrase "configured to" refers to any way of providing a function, and may encompass any implementation or combination thereof (software, hardware, firmware, manual processing operations, and so on). FIG. 9, to be discussed in turn, provides additional details regarding one illustrative implementation of the functions shown in the figures.

The concepts disclosed herein can most readily be understood in pictorial form. Thus, the explanation starts with a discussion of various user interface presentations that may be generated by a network-accessible service. The user interacts with the network-accessible service via these user interface presentations.

Figure 1:
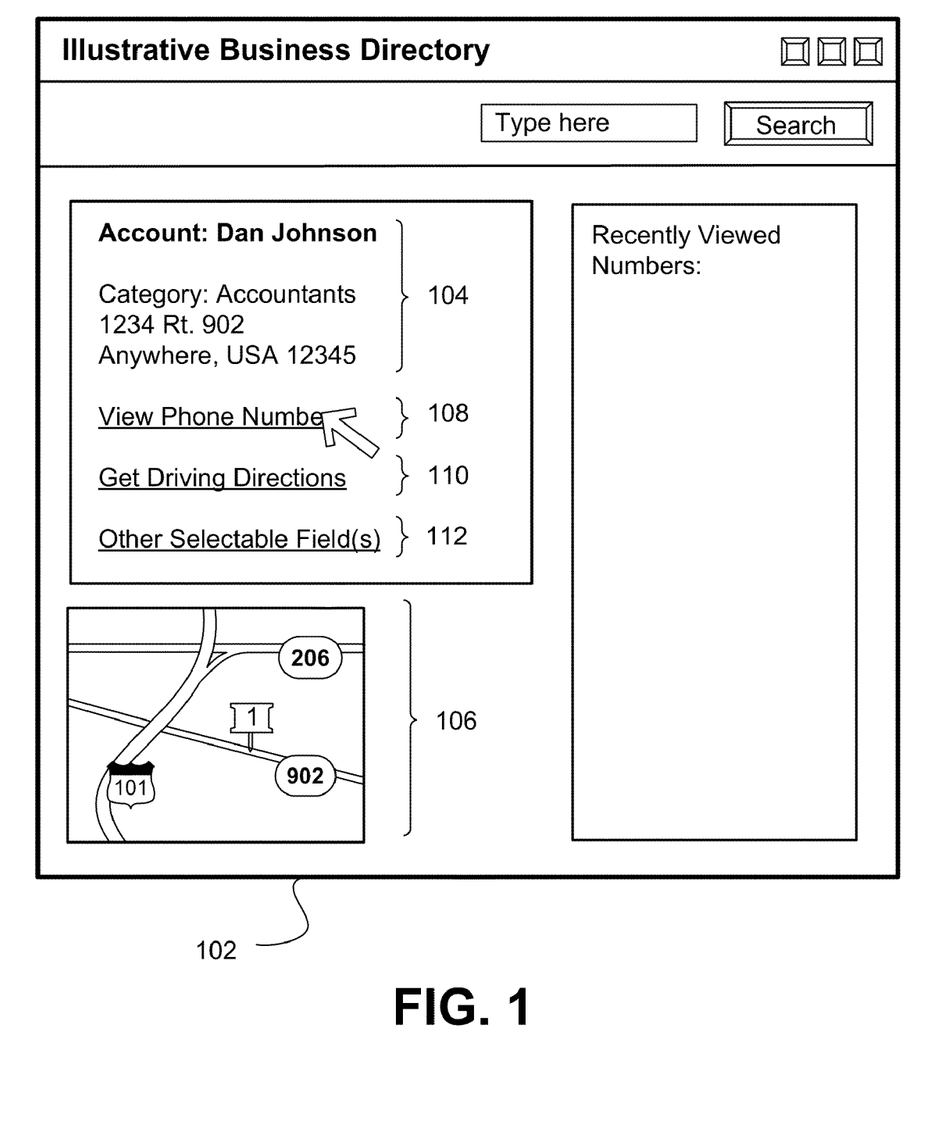
FIG. 1 shows an illustrative user interface presentation that includes a plurality of selectable items (e.g., telephone number prompts)

FIG. 1 shows one example of a UI presentation 102 that can be generated by one type of network-accessible service (simply "service" below). In this merely representative and non-limiting case, the service is an online business directory. A user may access the service to determine information regarding a particular business of interest. In operation, the service may first provide a home page (not shown) to the user. The user may then enter one or more search terms associated with the business of interest. Assume, for instance, that the user is looking for an accountant. The user may therefore enter "accountant" and "tax" as search terms. In one scenario, the service may respond by potentially providing a list (not shown) of businesses which correspond to the user's search terms. The user may eventually identify a business which matches his interest. The user can then request more detailed information regarding the business of interest. At this juncture, the service can deliver the UI presentation 102 shown in FIG. 1.

Namely, the UI presentation 102 of FIG. 1 presents various fields of information regarding a particular accountant, the hypothetical "Dan Johnson." For example, in information part 104, the UI presentation 102 may optionally present information regarding the name and address of the account Dan Johnson. In map part 106, the UI presentation 102 can present a map which identifies the geographical location of Dan Johnson's place of business. The UI presentation can present yet other kinds of information regarding this particular business entity. Further, the look and feel of the UI presentation 102 is merely representative.

The UI presentation 102, however, does not immediately present all of the available information regarding the business. Rather, the UI presentation 102 presents one or more selectable items that can be activated to discover additional information regarding the business. For example, the UI presentation 102 strategically omits the telephone number of the business. Instead of immediately revealing the telephone number, the UI presentation 102 provides a telephone number prompt 108. The user can activate the telephone number prompt 108 (e.g., by activating a graphical command, such as by clicking on this link) to discover the telephone number of the business. Similarity, the UI presentation 102 strategically omits driving directions to the business. Instead of revealing the driving directions, the UI presentation 102 provides a driving directions prompt 110. The user can activate the driving direction prompt 110 (e.g., by clicking on this link) to discover driving directions to the business.

FIG. 1 shows that the UI presentation 102 can include one or more other prompts 112. In the same manner described above, the UI presentation 102 may omit certain information associated with the other prompt(s) 112. The user can discover this additional information by activating the other prompt(s) 112.

Assume, in one scenario, that the user decides to activate the telephone number prompt 108. This action will cause the service to generate additional information, namely to display the telephone number of the business.

Figure 2:
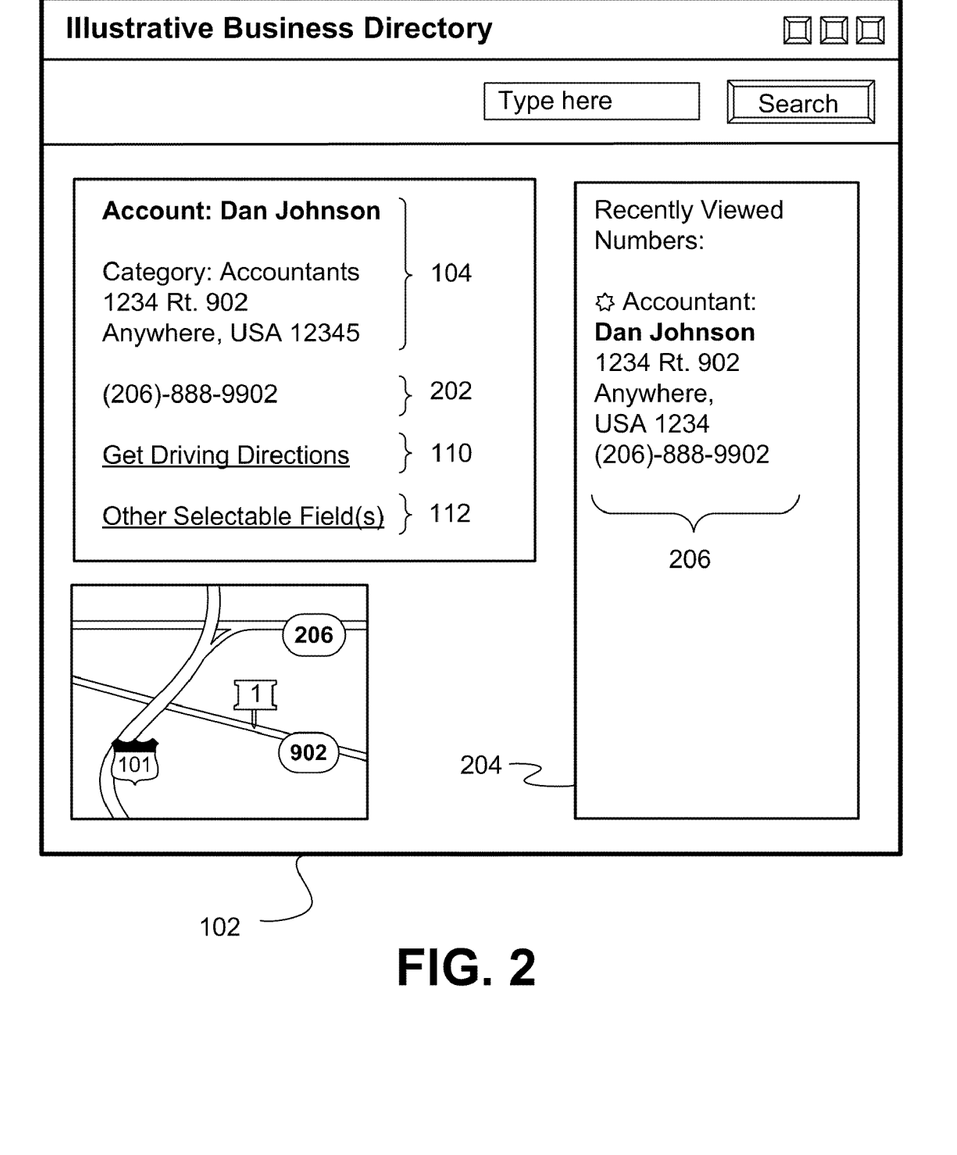
FIG. 2 shows the presentation of illustrative additional information (e.g., a telephone number) in response to the user's selection of one of the items (e.g., a telephone number prompt) in the user interface presentation of FIG. 1.

More specifically, FIG. 2 shows the representative outcome of the user's selection of the telephone number prompt 108. As indicated there, the UI presentation 102 presents additional information 202 in place of the telephone number prompt 108 of FIG. 1. In this case, the additional information corresponds to the telephone number of the business of interest.

The service also stores a record of the user's selection of the telephone number prompt 108. The service then presents information to the user regarding the user's prior selection of the telephone number prompt 108. Namely, as shown in FIG. 2, the UI presentation 102 may include a recently viewed numbers panel 204 (simply "panel" below). The panel 204 identifies all of the businesses for which the user activated a telephone number prompt 108 in the manner described above. In this merely illustrative case, the panel 204 includes only one entry 206, corresponding to the user's request to receive the telephone number of the accountant Dan Johnson.

The service may retain the information presented in the panel 204. As such, the service can display the panel 204 (which includes entry 206) in various UI presentations that it provides. For example, the service can display the panel 204 in its home page, or in any other page that it provides. The service may also display the panel 204 (which includes entry 206) over multiple separate uses of the service over an extended period of time.

Figure 3:
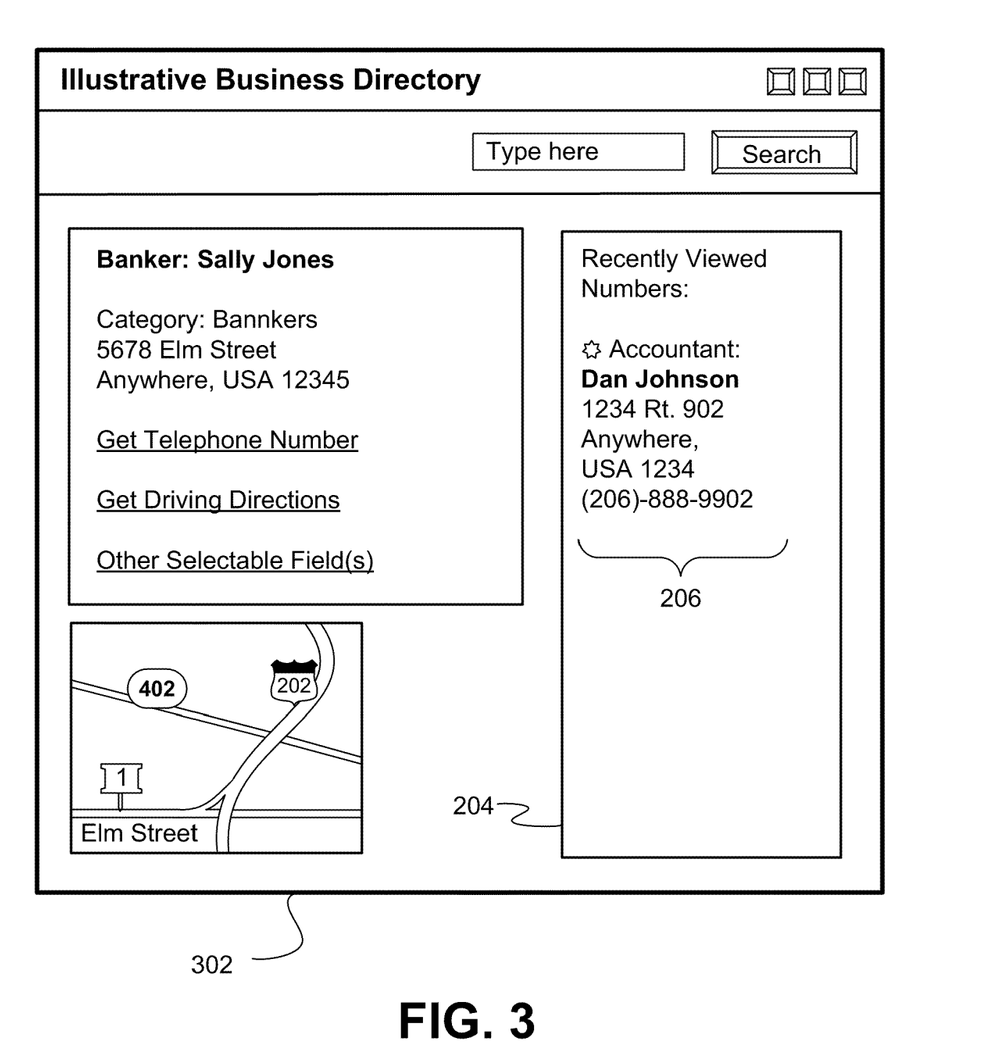
FIG. 3 shows the presentation of illustrative information regarding the user's prior selection of the item.

Consider, for example, the scenario shown in FIG. 3. Here, the user has returned to the service a few days later, and is now looking for a banker. In this case, the user is currently reviewing a UI presentation 302 that presents information regarding a hypothetical banker, Sally Jones. In this case, the service retrieves the record of the user's prior telephone number selections in the past, and uses this information to repopulate the panel 204. The panel 204 reveals information regarding the account Dan Johnson because the user activated the telephone number prompt 108 of that business on at least one prior occasion. The panel 204 would provide useful information to the user in the event that the user was again looking to contact an accountant (which, in this particular scenario, he is not).

According to a likely pattern of behavior, a user who takes the express step of activating a telephone number prompt is likely to be interested in calling the business. This correlation, in turn, suggests that a user may be particularly interested in any business for which he requested its telephone number. Accordingly, a list of recently viewed telephone numbers in the panel 204 is potentially more aligned with the user's actual interests than a generic list of recently viewed pages. For example, the user may visit the UI presentation 302 for the banker "Sally Jones," yet not ask for her telephone number. This suggests that the user may not have the requisite interest in this business to contact it. Her name will be excluded from the list of recently viewed numbers, since she has not met the requisite threshold of user interest.

The service can delete the information in the panel 204 based on one or more policies. In one case, the service can use a first-in-first-out (FIFO) approach to retain a list of the n most recent telephone numbers selected by the user. At some point, entries in the panel 204 will be pushed off the list as more recent entries are added to the list. In this case, the topmost entry in the panel 204 corresponds to the most recent telephone number selection by the user. Alternatively, or in addition, the service can remove an entry in the panel 204 when a prescribed amount of time has elapsed since its date of creation (that is, the date on which it was added to the panel 204). Alternatively, or in addition, the service can retain information regarding the frequency at which the user activates certain entries, for example, noting that the user has activated the Dan Johnson entry seven times in one year. The service can use this frequency information as a positive weighting factor in deciding which entries to remove from the list (and in deciding in what order in which to display the entries). The service may decide to retain Dan Johnson as a top entry even though the user has subsequently requested the telephone numbers of many other businesses. Alternatively, the service can devote a sufficiently large memory for storing entries such that the issue of the retention of entries is not a practical concern for most users.

As described above, the service uses information regarding the user's prior selections within the service to populate the panel 204 that it presents in various UI presentations associated with the service. In another case, a more "global" or overarching service can monitor the selections made by users with respect to one or more other "participating" services. The global service can retain records regarding these selections and then report such selections to the participating services. A participating service can rely on the global service to populate its recently viewed numbers panel 204 or the like. In this case, the panel 204 (or the like) can potentially include telephone numbers requested by a user in the context of plural participating services.

In yet another variation, a service can alternatively, or in addition, populate its panel 204 for any single user based on selections of telephone number prompts (or the like) made by several users (e.g., the service's entire population of users). The service can rank the entries that it displays in the panel 204 based on the popularity of these entries (e.g., based on the number of selections each entry receives).

A specific scenario was described above to appropriately communicate various concepts pertaining to the subject matter presented here. However, it should be emphasized that the general concepts disclosed herein are applicable to many different applications and environments. In a more general context, a service presents a UI presentation regarding some identified topic, such as an entity (e.g., a business entity in the example provided above). The service conceals some information from the UI presentation that the user will likely want to receive if the user is interested in performing some transaction with respect to the identified topic, or, more specifically, if the user is interested in performing some transaction with an entity associated with the topic. Thus, if in fact the user does request such additional information, it can be reasonably assumed that the user at least intends to perform the transaction. The approach presents a history of selections of this nature made by the user. The user is likely to find this history relevant to his current needs. This is because a user who has performed an express transaction with an entity is likely to repeat this transaction in the future.

In another example, the service can record the user's request to receive driving directions (by activating the driving directions prompt 110). This example is based on the same theory as stated above. If the user has requested driving directions to a business, the user is likely interested in visiting the business and performing a transaction with the business. Further, there is a reasonable chance that the user may wish to visit the same store gain. Accordingly, the panel of recently viewed numbers 204 can be expanded to include recently viewed driving directions or, alternatively, to presently just recently viewed driving directions.

In another example, a shopping service can present UI presentations regarding respective assets for sale. Each UI presentation can conceal one or more information items, such as a telephone number that may be called to inquire about the sale of the associated asset. The service can record the user's request for such a concealed information item and then present an indication of the user's request within a "recently selected" type of panel. In one example, this approach can be applied to an interactive media guide service that presents information regarding available real estate listings. If a prospective purchaser has taken the trouble to call a listing agent, it can be reasonably assumed that the user is relatively interested in this listing. Accordingly, such a listing is an appropriate candidate for the recently selected panel.

In another shopping service example, a user who places an item in a digital shopping cart is likely to have a strong interest in purchasing the item, even though the user may never follow through on this purchase. As such, the shopping service can retain and display a list of items that the user has placed in her shopping cart (but not purchased). The theory underlying this strategy is that the user may remain interested in these items and may want to purchase one or more of the items in the future.

Still further examples are possible. In addition, the list of recently selected items can be expanded to include items that are similar to the recently selected items, but the user may have never expressly selected these similar items. For example, assume that a user requests the telephone number of a relatively obscure business, such as a music store which sells vintage musical instruments. The service can accordingly include this business as an entry in the recently viewed list. In addition, the service can add other businesses to the list which are similar to the selected business. For example, the service can add other stores to the list which sell vintage musical instruments within a certain geographical distance of the music store that the user did select.

Still other variations are possible.

B. Illustrative Flowcharts

Figure 4:
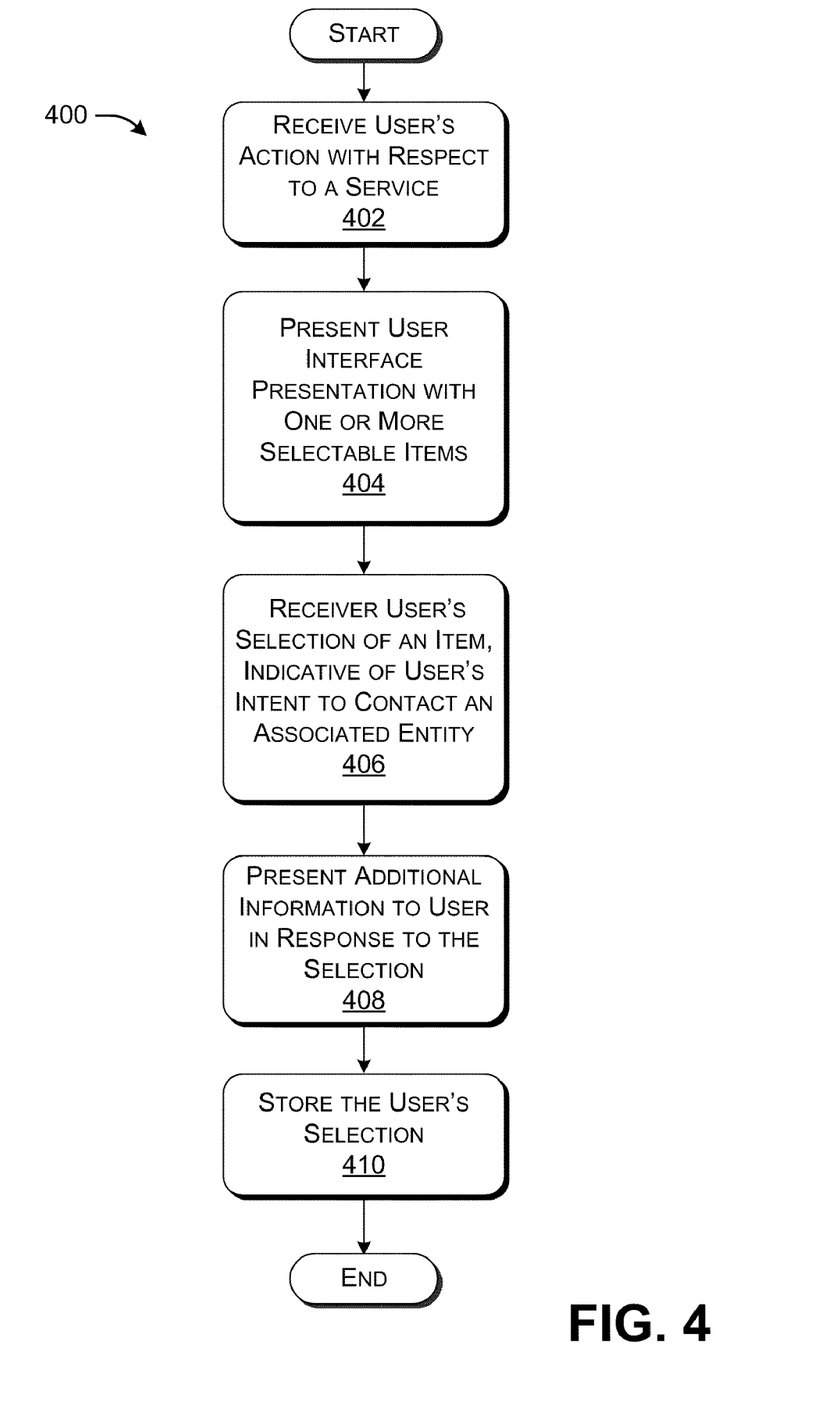
FIG. 4 is a flowchart that shows an illustrative procedure for recording a user's selection of items.
Figure 5:
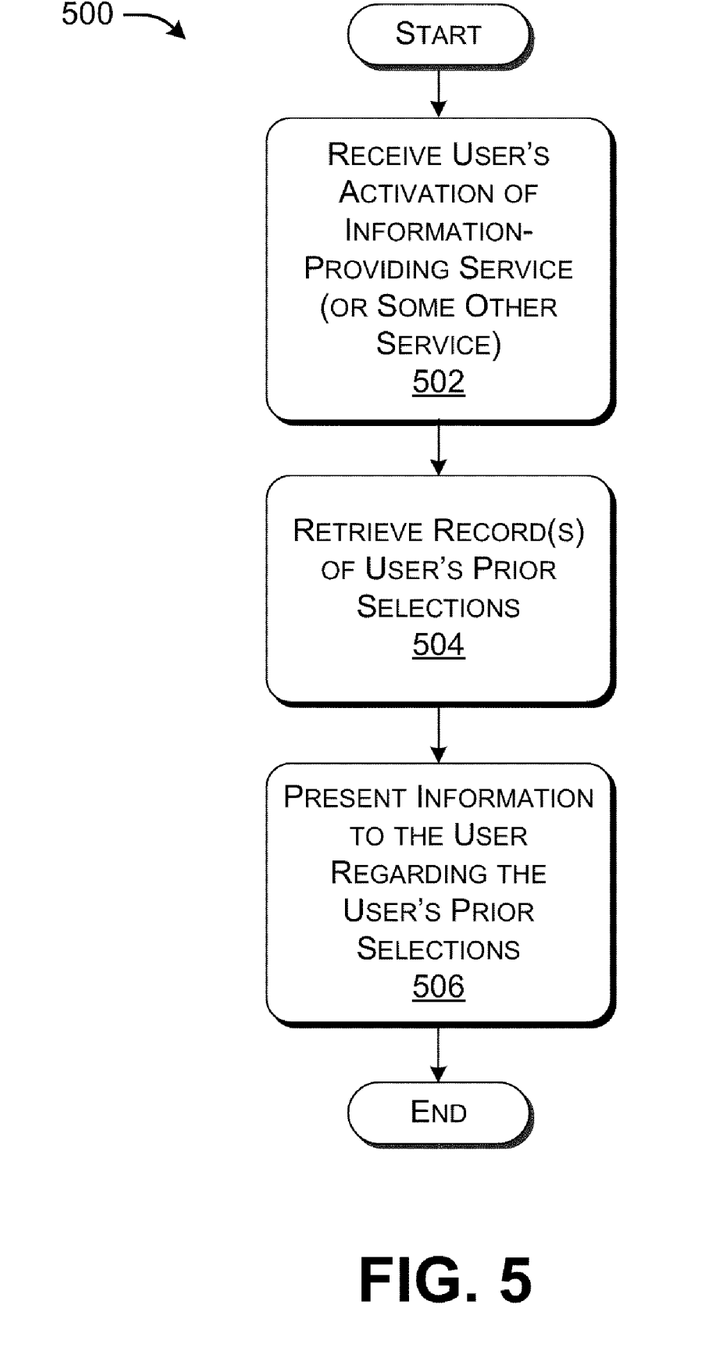
FIG. 5 is a flowchart that shows an illustrative procedure for presenting information regarding the user's prior selections.

FIGS. 4 and 5 illustrate the operation of the service in flowchart form. To facilitate discussion, certain operations are described in FIGS. 4 and 5 as constituting distinct blocks performed in a certain order. Such implementations are illustrative and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

FIG. 4 shows a procedure 400 for recording a user's selection of concealed additional information.

In block 402, the service receives the user's action with respect to the service. For example, the user can activate the service by entering a network address associated with the service. The user can then make various selections to navigate within the service, with the intent of finding information of interest. The user can perform this navigation in any manner, such as by making a keyword search, etc.

In block 404, the service presents a UI presentation of interest to the user in response to the user's input selections. For example, the service can present the UI presentation 102 shown in FIG. 1, associated with the business entity Dan Johnson.

In block 406, the service receives the user's request for additional information. For example, the user may ask the service to reveal the telephone number of the accountant Dan Johnson in the manner described above.

In block 408 the service can present the additional information requested by the user, e.g., the telephone number of the business.

In block 410, the service can store a record of the user's selection. As will be described shortly, the user's client device may store this record using a cookie-based approach or using some other mechanism.

FIG. 5 shows a procedure 500 for displaying the user's recent selections of concealed information (e.g., telephone numbers, etc.).

In block 502, assume that the user has returned to the same service at a later time. In this block 502, the user requests the service, e.g., by inputting the network address of the service.

In block 504, the service retrieves information regarding prior selections made by the user (where, again, those prior selections are particularly chosen to correlate with the user's actual interests).

In block 506, the service presents information to the user regarding the user's prior selections. For example, the service can present this information to the user within the panel 204. The service can present this panel 204 in the context of any (or all) of the UI presentations that it provides. In an alternative implementation, a more global service can record the selections that the user makes within plural participating services. Each participating service can display a "recently selected" type list that may encompass selections made over plural participating services.

C. Illustrative Systems

Figure 6:
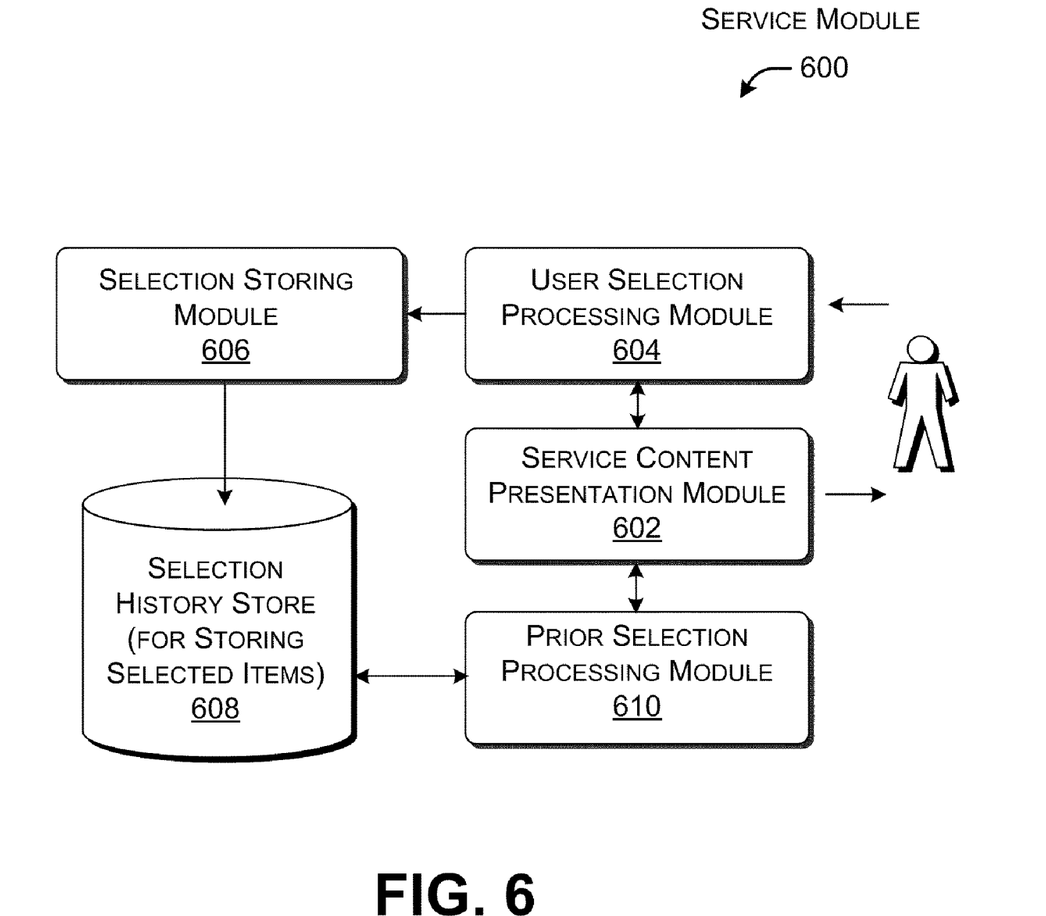
FIG. 6 shows an illustrative service module for recording selections made by a user and later presenting information regarding these selections.
Figure 7:
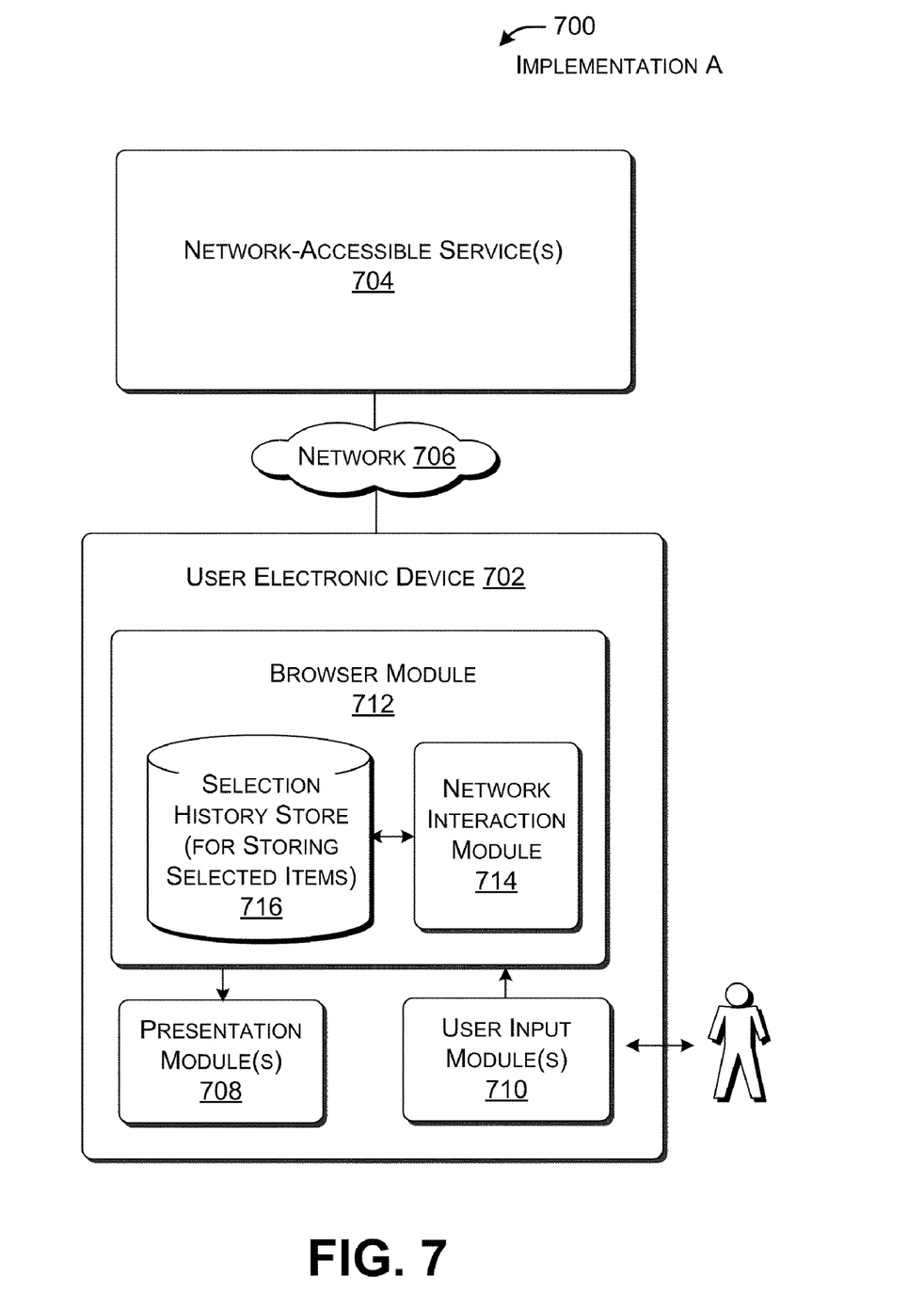
FIG. 7 shows one illustrative implementation of the service module of FIG. 6.
Figure 8:
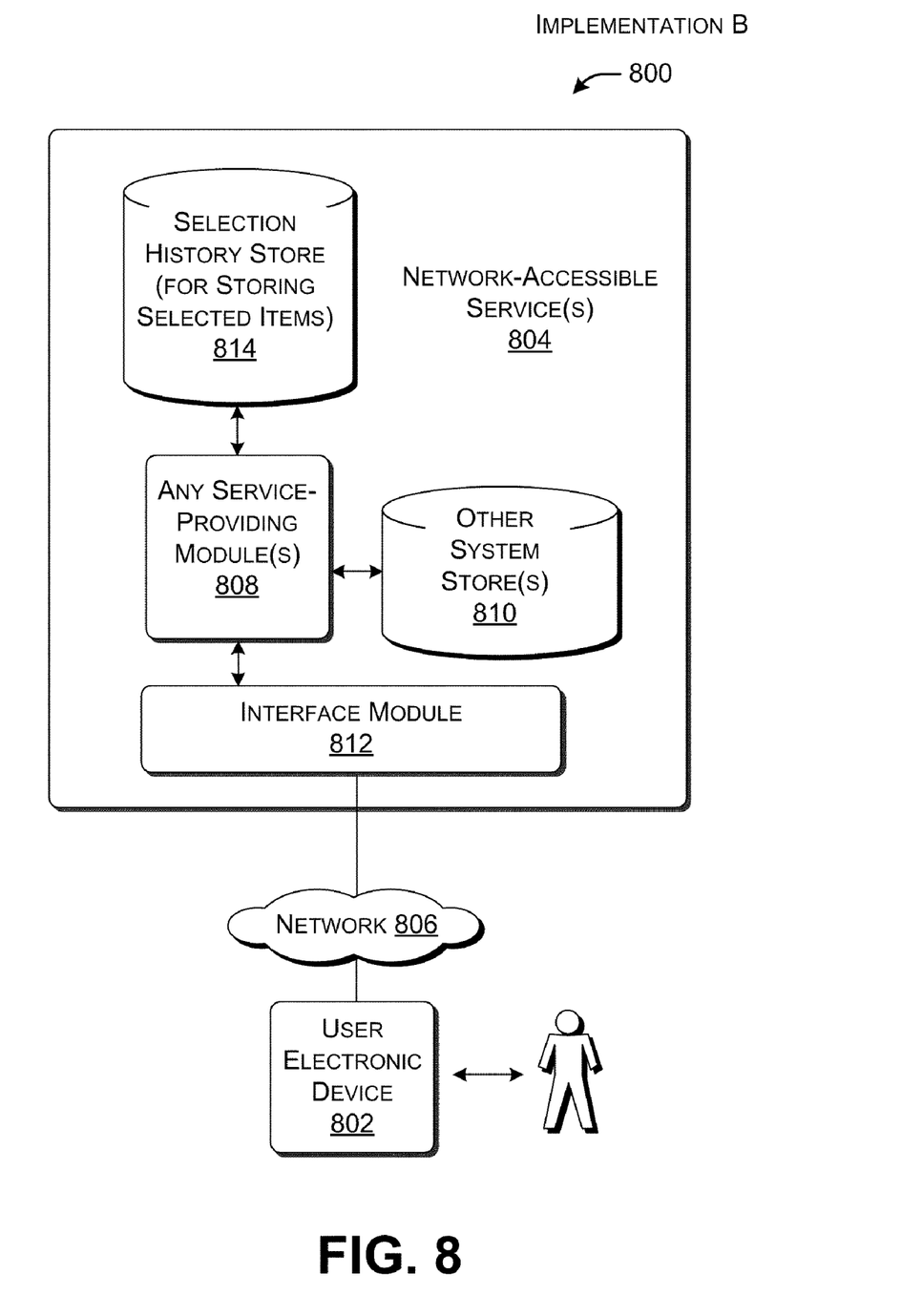
FIG. 8 shows another illustrative implementation of the service module of FIG. 6.

FIG. 6 shows a service module 600 for providing a network-accessible service that implements the features described above. The service module 600 is illustrated from a logical perspective in FIG. 6 to emphasize the various functions that it may perform. FIGS. 7 and 8 show how the service module 600 can be physically implemented in various scenarios. (More generally, the illustrated separation of various components in the figures into distinct units may reflect the use of corresponding distinct physical components. Alternatively, or in addition, the depiction of any two or more separate components in the figures may reflect different functions performed by a single physical component. Alternatively, or in addition, the depiction of a single component in the figures may reflect functions performed by two more physical components.)

The service module 600 includes a service content presentation module 602. This module 602 delivers some network-accessible service to a user, such as, but not limited to, the above-described business directory service. That is, this module 602 delivers all of the UI presentations provided by the service.

The service module 600 also includes a user selection processing module 604. This module 604 receives all input selections from the user. For instance, this module 604 receives the user's activation of the service itself, the user's selections when navigating within the service, and so on. This module 604 also receives the user's request for additional information which is currently concealed from certain UI presentations. For example, this module 604 receives the user's activation of the telephone number prompt 108 shown in FIG. 1, causing the service content presentation module 602 to display the requested telephone number.

A selection storing module 606 creates a record of the user's request for additional information. The selection storing module 606 stores such record in a selection history store 608.

A prior selection processing module 610 retrieves records stored in the selection history store 608. The prior selection processing module 610 provides this information to the service content presentation module 602. The service content presentation module 602 can present information regarding the user's recent selections in the above-described panel 204 (for instance).

FIG. 7 shows one system 700 for implementing the service module 600 of FIG. 7. In this example, a user electronic device 702 is coupled to a network-accessible service 704 via a network 706. The user electronic device 702 can correspond to any type of electronic processing apparatus, such as a general purpose desktop computer, a special purpose computer, a laptop computer, a personal digital assistant (PDA) type device, a mobile telephone device, a set-top box, a game console, and so on. The user electronic device 702 can include one or more presentation modules 708 (e.g., display devices, etc.) and one or more input modules 710 (e.g., keyboards, mouse devices, etc.). The user electronic device 702 can also include a browser module 712 (and associated network interaction module 714) that allows the user electronic device 702 to communicate with the network-accessible service 704 via the network 706.

The network-accessible service 704 can comprise one or more server-type computers (not shown), data stores (not shown), and other processing equipment (not shown) for implementing service-related functionality.

The network 706 may represent any type of mechanism for allowing the user electronic device 702 to interact with the network-accessible service 704. The network 706 can correspond to a wide area network (such as the Internet), a local area network (LAN), a point-to-point connection, or any combination of connectivity mechanisms. The network 706 can be physically implemented using any combination of hardwired links, wireless links, name servers, gateways, routers, and so on (not shown). The network 706 can be governed by any protocol or combination of protocols.

In one example, the network-accessible service 704 implements most of the functionality provided by the service module 600 of FIG. 6. However, in this example, the user electronic device 702 can store the records regarding the user's selection in a local selection history store 716. The network-accessible service 704 can access these records at the time of its presentation of the service. The network-accessible service 704 can use these records to populate the "recently selection" type panel 204. This scenario may be potentially attractive to a user because the network-accessible service 704 can perform its function without requesting detailed personal information regarding the user.

FIG. 8 shows another system 800 for implementing the service module 600 of FIG. 6. In this example, a user electronic device 802 again interacts with a network-accessible service 804 via a network 806. But in this case, the network-accessible service 804 maintains records regarding the user's selections, rather than the user electronic device 802.

More specifically, the network-accessible service 804 includes a service-providing module 808 which, in conjunction with one or more system stores 810 provides a service to a user via an interface module 812. The service-providing module 808 can register each user's selections and store records regarding such selections in a network history selection store 814. In this example, it may be appropriate for the user to enter personal identifying information, because the network-accessible service 804 will want to discriminate the behavior of one user from another.

In a variation of the approach of FIG. 8, however, the network-accessible service 804 can ask the user electronic device 802 to store a cookie-based record for use in identifying the user to the network-accessible service 804. The network-accessible service 804 can then associate the user's selections (which are maintained in the network selection history store 814) with the user without asking the user to provide detailed personal information in a prior configuration operation.

Still other implementations of the service module 600 are possible.

D. Representative Processing Functionality

FIG. 9 sets forth illustrative electrical data processing functionality or equipment 900 (simply "processing functionality" below) that can be used to implement any aspect of the functions described above. With reference to FIGS. 7 and 8, for instance, the processing functionality 900 can be used to implement the network-accessible services (704, 804). With reference to the same figures, the processing functionality 900 can also (or alternatively) be used to implement the user electronic devices (702, 802). The processing functionality 900 may correspond to a general purpose computing device, a special purpose computing device, or any other implementation.

The processing functionality 900 can include volatile and non-volatile memory, such as RAM 902 and ROM 904, as well as one or more processing devices 906. The processing functionality 900 also optionally includes various media devices 908, such as a hard disk module, an optical disk module, and so forth. The processing functionality 900 can perform various operations identified above when the processing device(s) 906 executes instructions that are maintained by memory (e.g., RAM 902, ROM 904, or elsewhere). More generally, instructions and other information can be stored on any computer-readable medium 910, including, but not limited to, static memory storage devices, magnetic storage devices, optical storage devices, and so on. The term "computer-readable medium" also encompasses plural storage devices. The term "computer-readable medium" also encompasses signals transmitted from a first location to a second location, e.g., via wire, cable, wireless transmission, etc. The term "logic" describes instructions for performing identified tasks; for example, service logic corresponds to instructions associated with various tasks performed by the service module 600 as described above.

The processing functionality 900 also includes an input/output module 912 for receiving various inputs from a user (via input modules 914), and for providing various outputs to the user (via output modules). One particular output mechanism may include a presentation module 916 and an associated graphical user interface (GUI) 918. The processing functionality 900 can also include one or more network interfaces 920 for exchanging data with other devices via one or more communication conduits 922. One or more communication buses 924 communicatively couple the above-described components together.

In closing, the description may have described various concepts in the context of illustrative challenges or problems. This manner of explication does not constitute an admission that others have appreciated and/or articulated the challenges or problems in the manner specified herein.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for presenting information regarding selected items, the method being performed on electronic data processing equipment, the method comprising:
   receiving a user's action with respect to a service;
   presenting, in response to the user's action, a first service-provided user interface presentation to the user, the first service-provided user interface presentation pertaining to a first entity and including one or more first selectable items;
   receiving a selection from the user of an item provided by the first service-provided user interface presentation, to provide a user's selection of the item;
   presenting additional information to the user in response to the user's selection of the item, the additional information being concealed from the first service-provided user interface presentation, the additional information enabling the user to contact the first entity, the user's selection of the item thus being indicative of an intent of the user to contact the first entity;
   storing, by the service, in direct response to the user's selection of the item, a record which reflects the user's selection of the item and associated request to receive the additional information;
   presenting a second service-provided user interface presentation to the user, the second service-provided user interface presentation pertaining to a second entity and including one or more second selectable items, the user not selecting any item in the second selectable items;
   retrieving the record; and
   based on the record, presenting information to the user regarding the user's prior selection of the item in the first service-provided user interface presentation, but excluding information associated with the second entity.

2. The method of claim 1, wherein the item that is selected in the first service-provided user interface presentation is a telephone number prompt, wherein the telephone number prompt invites the user to activate the telephone number prompt to discover a telephone number associated with the first entity, wherein the user's selection of the telephone number prompt is indicative of a decision by the user to contact the first entity by telephone.

3. The method of claim 1, wherein the service is a network-accessible service.

4. The method of claim 3, wherein the network-accessible service is a network-accessible business directory, and the first entity is a business entity.

5. The method of claim 3, wherein the network-accessible service is an interactive media guide that presents information regarding assets for sale.

6. The method of claim 1, wherein said storing comprises storing the record in a store that is local with respect to an electronic device that the user uses to interact with the service.

7. The method of claim 6, wherein the store that is local with respect to the electronic device is a cookie-related store provided by the electronic device.

8. The method of claim 1, wherein said storing comprises storing the record in a network-related store.

9. The method of claim 1, further comprising presenting a user interface panel to the user which provides information regarding prior selections made by the user, wherein the information regarding the user's prior selection of the item in the first service-provided user interface presentation is presented within the user interface panel.

10. The method of claim 9, wherein the service displays the user interface panel as part of one or more user interface pages that the service provides to the user.

11. The method of claim 9, wherein another service displays the user interface panel as part of one or more user interface pages that the other service provides to the user.

12. A physical computer-readable storage medium for storing computer-readable instructions, the computer-readable instructions providing a service module when executed by one or more processing devices, the computer-readable instructions comprising:
- logic configured to receive a user's action with respect to a network-accessible service;
- logic configured to present, in response to the user's action, a service-provided user interface presentation that provides information regarding a topic, wherein the service-provided user interface presentation includes one or more prompts;
- logic configured to receive a selection from the user of a prompt provided by the service-provided user interface presentation, to provide a user's selection of the prompt;
- logic configured to present additional information to the user in response to the user's selection of the prompt, the additional information enabling the user to engage in a transaction associated with the topic, the user's selection of the prompt being indicative of an intent of the user to perform the transaction; and
- logic configured to store a record which reflects the user's selection of the prompt, in direct response to the user's selection of the prompt, wherein said logic configured to store does not store the record if the user does not select the prompt.

13. The computer-readable storage medium of claim 12, wherein the topic pertains to a business entity and the prompt that is selected is a telephone number prompt, wherein the user's selection of the prompt is indicative of a decision by the user to perform the transaction of contacting the business entity by telephone.

14. The computer-readable storage medium of claim 12, wherein the network-accessible service is a network-accessible business directory, and wherein the topic pertains to a business entity identified in the network-accessible business directory.

15. The computer-readable storage medium of claim 12, wherein the network-accessible service is an interactive media guide and the topic is associated with an asset for sale.

16. A service module, implemented by electrical data processing functionality, comprising:
- logic configured to access a store that provides records regarding one or more prior selections made by a user, each selection reflecting prior selection by the user of a telephone number prompt, to provide a user's selection of the telephone number prompt, the activation of the telephone number prompt resulting in the display of a previously-concealed telephone number associated with an entity, the user's selection of the telephone number prompt being indicative of a decision by the user to contact the entity via telephone; and
- logic configured to present information to the user regarding the user's said one or more prior selections, the presented information giving the user an indication of one or more entities that the user had an intent to contact by telephone,
- the information that is presented to the user excluding information regarding any entity for which the user did not activate an associated telephone number prompt,
- the logic configured to present information to the user being configured to present the information within a user interface panel, wherein the user interface panel is presented on a same page as other information provided by a network-accessible service,
- the logic configured to access a store and the logic configured to present information being implemented by the electrical data processing functionality.

17. The service module of claim 16, wherein each entity is a business entity, and wherein the user's selection of each telephone number prompt occurs with respect to an interaction by the user with a network-accessible business directory.

18. The method of claim 1, wherein said receiving of the user's action with respect to the service comprises receiving a request by the user to receive more detailed information regarding the first entity, which prompts the service to provide the first service-provided user interface presentation to the user,
- wherein the service does not store the record until the user selects the item in the first service-provided user interface presentation.

* * * * *